United States Patent [19]
Aulia et al.

[11] Patent Number: 5,341,430
[45] Date of Patent: Aug. 23, 1994

[54] DEVICE FOR EFFECTING A MODIFICATION IN A STREAM OF TRANSMISSION CELLS

[75] Inventors: Ari N. Aulia, Delft; Jan C. Groenendijk, Oegstgeest, both of Netherlands

[73] Assignee: Koninklijke PTT Nederland N.V., Groningen, Netherlands

[21] Appl. No.: 20,988

[22] Filed: Feb. 22, 1993

[30] Foreign Application Priority Data

Mar. 3, 1992 [NL] Netherlands ............... 9200391

[51] Int. Cl.⁵ .................................................. H04L 9/00
[52] U.S. Cl. ........................................ 380/49; 370/85.1; 381/20
[58] Field of Search .................. 380/9, 20, 49; 370/85, 370/86, 89; 381/20.1

[56] References Cited

U.S. PATENT DOCUMENTS

| 4,566,097 | 1/1986 | Bederman | 370/89 |
| 4,567,590 | 1/1986 | Bederman | 370/86 |
| 4,769,814 | 9/1988 | Bederman et al. | 370/85 |
| 5,072,447 | 12/1991 | Perloff et al. | 381/20.1 |

FOREIGN PATENT DOCUMENTS

0147644A3 7/1985 European Pat. Off. .
0427066A2 5/1991 European Pat. Off. .
2660501 10/1991 France .
2660502 10/1991 France .

Primary Examiner—David C. Cain
Attorney, Agent, or Firm—Frishauf, Holtz, Goodman & Woodward

[57] ABSTRACT

A device for effecting a modification in a stream of transmission blocks detects a transmission block to be modified and generates a detection signal via detection means, which comprises delay means for effecting a delay in the stream of transmission blocks. The device further comprises memory means for generating, in response to the detection signal, the modification to be applied, and combining means for combining the stream of transmission blocks and the modification to be applied, provided with a first input for receiving the stream of transmission blocks, with a second input for receiving the modification to be applied and with an output for generating a modified stream of transmission blocks. The combining means comprises switch-over means for coupling one of the inputs through to the output, as a function of the detection signal. Due to the use of the switch-over means and due to the delay means being a part of the detection means, the combining means can be bufferless.

5 Claims, 1 Drawing Sheet

DEVICE FOR EFFECTING A MODIFICATION IN A STREAM OF TRANSMISSION CELLS

A. BACKGROUND OF THE INVENTION

The invention relates to a device for effecting a modification in a stream of transmission blocks containing information, provided with detection means for detecting a transmission block to be modified and for generating a detection signal, memory means for generating, in response to the detection signal, the modification to be applied, and combining means for combining the stream of transmission blocks and the modification to be applied, provided with a first input for receiving the stream of transmission blocks, with a second input for receiving the modification to be applied and with an output for generating a modified stream of transmission cells.

A device of this type of known from I.E.E.E. Communications Magazine No. 4, April 1988, New York, USA, "The QPSX Man", R. M. Newman, Z. L. Budrikis, J. L. Hullet, pp. 20–28, in particular FIG. 2. The device described therein comprises an Access Unit (AU) which forms the detection means for detecting the transmission block to be modified, and which forms the memory means for generating the modification to be applied. An OR gate forms the combining means for combining the stream of transmission blocks and the modification to be applied. The OR gate is provided with the first input for receiving the stream of transmission blocks and the second input for receiving the modification to be applied. As soon as the header of the transmission block to be modified is detected by the AU, the AU generates the modification to be applied in the form of bits which are fed to the second input of the OR gate, the original information contents of the transmission block to be modified being fed at the same time to the first input of the OR gate. If the original information contents have the value zero, (i.e. all bits thereof have the logical value zero), the new information contents are formed by the modification to be applied. If the original information contents have a value not equal to zero (i.e. at least one of the bits thereof has the logical value one), the new information contents are formed by the logical bitwise addition by the OR gate of the original information contents and the modification to be applied. In this last case, either the original information contents should be known to the AU in advance, or, after detection by the AU, a calculation should be carried out which enables the AU to generate the modification, with which, by logical bitwise addition by the OR gate, the desired new information contents are obtained.

The known device has the drawback that, if the original information contents of the transmission blocks to be modified have a value not equal to zero, there should either be prior knowledge located at the AU or a calculation should be carried out by the AU, which takes time and which limits the maximum clock rate of the stream of transmission blocks.

SUMMARY OF THE INVENTION

The object of the invention is, inter alia, to provide a device of the type mentioned above, by means of which a transmission blocks or a part thereof can be replaced in a way which is independent of the information contents of the transmission blocks to be modified or the part thereof to be modified.

To this end, the device according to the invention is characterized in that the combining means comprise switch-over means for coupling one of the inputs through to the output, as a function of the detection signal.

By constructing the combining means as switch-over means, such as, for example, an electronic changeover switch which optionally connects the first or the second input to the output, any modification to be applied in the stream of transmission blocks becomes possible, independent of the information contents of the transmission blocks to be modified or the part thereof to be modified.

The invention is based on the insight that, after detection of the transmission blocks to be modified, modification of the transmission blocks or the part thereof is preferably carried out by replacing said transmission blocks or said part by the modification to be applied, without buffering.

In a first embodiment, the device according to the invention is characterized in that the detection means are adapted for effecting a delay in the stream of transmission blocks.

In this case, the part to be modified of the transmission blocks may comprise any part chosen at will of said transmission blocks (such as, for example, the header). Effecting the delay in the stream of transmission blocks prevents, for example if the header forms the part to be modified, said header from having already partially passed the switch-over means before complete detection thereof and thus before it has been possible for the modification thereof to be applied to take place.

In a second embodiment, the device according to the invention is characterized in that the switch-over means comprise a further output for coupling through, as a function of the detection signal, and at the same time, one of the inputs to the output and the other input to the further output.

As a result, the transmission blocks which has been removed from the stream via the switch-over means appears at the further output, whereupon said transmission blocks may, for example, be stored or undergo further processing.

In a third embodiment, the device according to the invention is characterized in that the device is provided with a combination circuit for combining the detection signal and a ready signal, the memory means being adapted for generating the ready signal if they have been loaded with a new transmission block.

This prevents, if the memory means have not yet finished loading the new transmission block, only the part thereof loaded up to that instant from being applied in the stream.

In a fourth embodiment, the device according to the invention is characterized in that the device is provided with processor means, which are coupled to the detection means, for generating the modification to be applied and for feeding it to the memory means.

By using the processor means it is possible to replace transmission block to be modified with transmission block which differ from one another. The processor means in this case, after detection of the transmission block to be modified, should generate the modification to be applied and feed it to the memory means, which should read said modification to be applied and store it, before the transmission block to be modified leaves the detection means. Considerable demands with regard to speed are therefore made on the processor means and the memory means in this case.

In a fifth embodiment, the device according to the invention is characterized in that the memory means are provided with a first memory for generating a modification of a first type to be applied, a second memory for generating a modification of a second type to be applied, and through-coupling means for coupling through, as a function of a control signal, one of the memories to an output of the memory means, the processor means being adapted for generating the control signal in response to the detection signal.

In this case, the considerable demands, made with regard to speed, on the processor means and the memory means are no longer necessary, because mutually different transmission blocks to be applied in the stream are stored in the different memories and, after detection of a transmission blocks to be modified, only the through-coupling means are required to be fed with the correct control signal to be able to effect the transmission block already stored in one of the memories in the stream.

C. REFERENCE

I.E.E.E. Communications Magazine No. 4, April 1988, New York, USA, "The QPSX Man", R. M. Newman, Z. L. Budrikis, J. L. Hullet, pp. 20–28.

ILLUSTRATIVE EMBODIMENT

Figure 1:
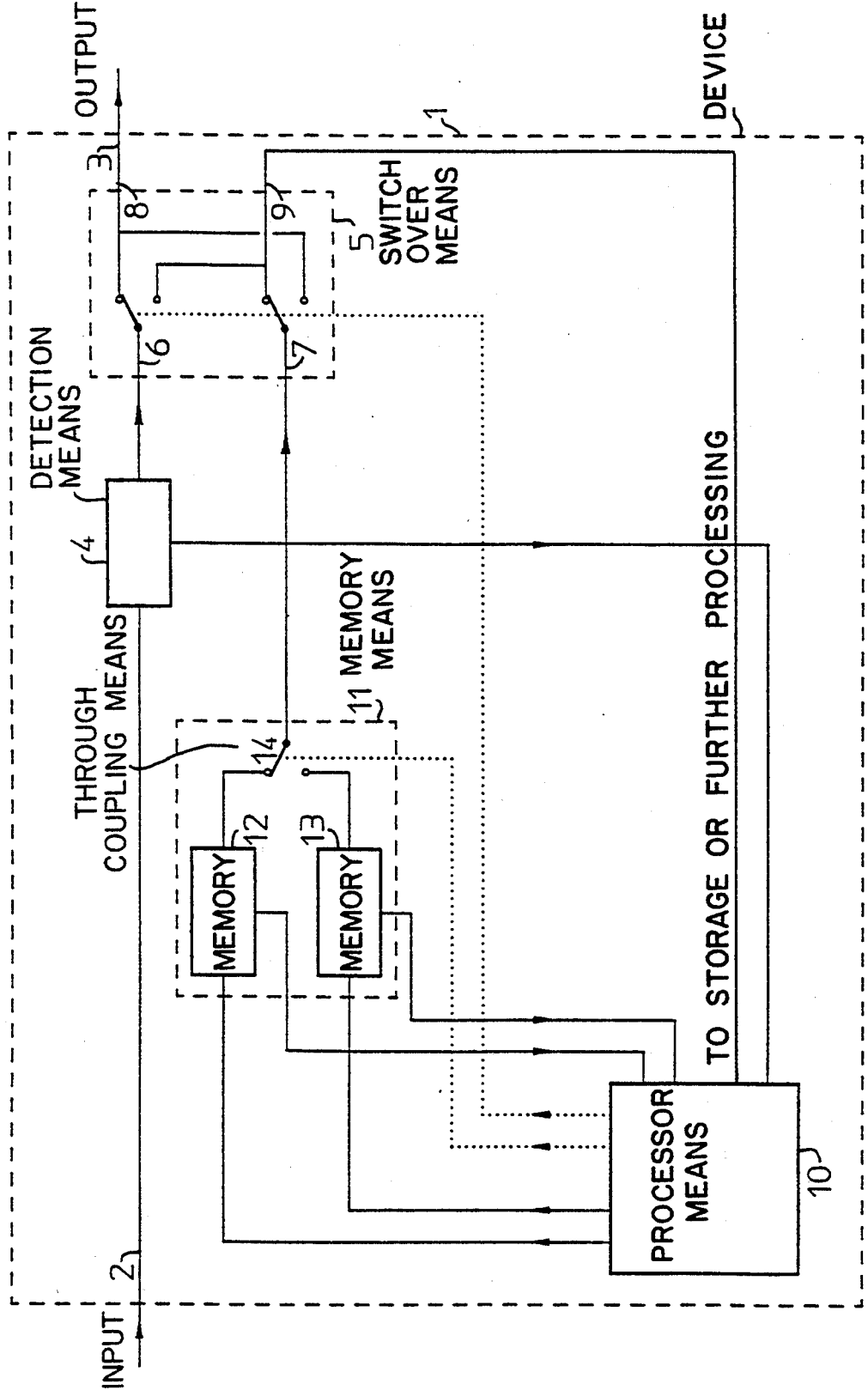
FIG. 1 shows a device for effecting a modification in a stream of transmission blocks.

The invention will be explained in more detail with reference to an illustrative embodiment shown in the figure.

The device 1 shown in FIG. 1 comprises an input 2 for receiving the stream of transmission blocks and an output 3 for generating a modified stream of transmission cells. Input 2 is connected to an input of detection means 4 for detecting a transmission block to be modified. An output thereof is connected to an input 6 of switch-over means 5. An input 7 of the latter is connected to an output of memory means 11. Switch-over means 5, in the case of a switch-over signal in one direction, connect the input 6 to the output 8 and the input 7 to an output 9, and, in the case of a switch-over signal in the other direction, connect the input 6 to the output 9 and the input 7 to the output 8. Switch-over means 5 are widely available in integrated form, but may also be effected in a simple manner known to a person skilled in the art by using two times three OR gates (the input of the first OR gate is then coupled to input 6, an input of the second OR gate is then coupled to input 7, the two remaining inputs of said OR gates are driven, in an inverted manner with respect to one another, by the switch-over signal, and both outputs are combined by the third OR gate which thereby forms output 8, etc.). Memory means 11 comprise a memory 12 for storing and generating a modification of a first type to be applied, and a memory 13 for storing and generating a modification of a second type to be applied, outputs of which memories are each connected to a different selector contact of through-coupling means 14. A main contact of through-coupling means 14 forms the output of memory means 11. In the case of a control signal in one direction, through-coupling means 14 connect memory 12, and in the case of a control signal in the other direction they connect memory 13, to the output of memory means 11. Device 1 further comprises processor means 10 which generates [sic] the modifications of the first type and of the second type to be applied, and feeds [sic] them to memory 12 and memory 13, respectively, and which generates [sic] the switch-over signal for switch-over means 5 and the control signal for through-coupling means 14. Processor means 10 further receive a detection signal from detection means 4, which indicates whether a transmission block or a part thereof is or is not required to be modified. The memories 12 and 13, as soon as they have finished loading a new transmission block or a part thereof (if only that part should be loaded), each generate a ready signal which is fed to the processor means and is there combined, by means of software, with the detection signal, in order to prevent a transmission block which has not yet been loaded completely, or a part thereof which has not yet been loaded completely, from being added to the stream of transmission blocks. Said combination by means of software could obviously also be implemented by means of hardware, by using a combination circuit not shown in the figure, such as, for example, an AND gate.

The device 1 shown in FIG. 1 works as follows. A stream of transmission blocks containing information is supplied to input 2 and is detected by detection means 4. If the stream of transmission blocks is based on ATM (Asynchronous Transfer Mode) techniques, detection means 4 could be formed by a shift register, which comprises the header or another part of the transmission block containing one or more bits or said transmission block as a whole and compares this with a predetermined data word and, in the case of identity, generates the detection signal. If the stream of transmission blocks is based on STM (Synchronous Transfer Mode) techniques, in which case it is therefore known in advance which transmission block arrives at a given instant, detection means 4 could also be formed by a clock-extraction circuit which establishes the clock signal of the stream of transmission cells, from which it is then possible to derive the detection signal via counting means. The advantage of using a shift register as detection means is that such a shift register automatically applies a delay in the stream of transmission blocks, which makes it possible to replace, for example, even the header of a transmission block.

As long as no transmission blocks are required to be modified, the stream of transmission blocks, via detection means 4 and via input 6 and output 8 of switch-over means 5, flows to output 3 of device 1, as a result of switch-over means 5 being supplied by processor means 10 with a switch-over signal in one direction. If a transmission block or a part thereof is required to be modified, this is detected by detection means 4, which generate the detection signal which is fed to processor means 10. In response thereto, these generate a switch-over signal in the other direction which is fed to switch-over means 5, as a result of which input 6 is through-connected to output 9, and input 7 is through-connected to output 8 therein. The transmission block to be modified or the part thereof to be modified flows from input 6 to output 9, where storage or further processing may take place. At the same time, the modification to be applied flows, under the control of processor means 10, from memory means 11 via input 7 and output 8 to output 3, as a result of which the modification is applied in the original stream of transmission blocks. If, thereafter, no transmission block is required to be modified, processor means 10 generate the switch-over signal in one direction, as a result of which the stream of transmission blocks once again flows from input 2 via input 6 and output 8 to output 3.

One or more modifications of the first type to be applied are stored in memory 12, and one or more modifications of the second type to be applied are stored in memory 13. These modifications are generated by processor means 10 and fed to memories 12 and 13 via connections arranged between processor means 10 and memories 12 and 13. Memories 12 and 13 generate a modification in response to a command signal to be generated by processor means 10, which command signal can likewise be fed to memories 12 and 13 via said connections. It is however also possible, for example, to feed, instead of the command signal, a subsequent modification to memory 12, 13 if, as a result, a modification loaded earlier automatically shifts out memory 12, 13. Which control signal (in one direction, a modification of the first type being applied, or in the other direction, a modification of the second type being applied) is generated by the processor means could be determined by the processor means themselves on the basis of prior knowledge. It is also possible for the detection signal to contain additional information regarding the desired modification to be applied.

The term transmission block is to be interpreted as widely as possible. It comprises at least an information-containing part of one or more bits and, in addition thereto, may also comprise a header part of one or more bits. The information whether a transmission block or a part thereof is required to be modified, and which part this applies to, is stored in one or more bits which may be located both in the information-containing part and in the header part. A transmission block may be composed of octets, for example 53 octets of 8 parallel bits each, in which case eight (parallel) devices will be required to effect a modification.

The device for effecting a modification in a stream of transmission blocks, such as, for example, a frame, is obviously also suitable for replacing a whole frame by another frame. In that case, the detection means 4 detect, for example, the header of the frame to be replaced and generate the detection signal, in response whereto the processor means 10, via through-coupling means 14, for example connect the memory 12 through to switch-over means 5. Memory 12 should then already contain the header of the other frame and, while both headers pass the switch-over means 5, the processor means 10 should feed the remaining part of the other frame to memory 12.

We claim:

1. Device for effecting a modification in a stream of transmission blocks provided with detection means for detecting a transmission block to be modified and for generating a detection signal, memory means for generating, in response to the detection signal, the modification to be applied, combining means for combining the unmodified stream of transmission blocks and the modification to be applied, provided with a first input for receiving the stream of unmodified transmission blocks, with a second input for receiving the modification to be applied and with an output for generating a modified stream of transmission blocks, and delay means for effecting a delay in said unmodified stream of transmission blocks characterized in that the detection means comprises the delay means and in that the combining means comprises switch-over means for coupling one of said inputs of said combining means through to the output thereof, as a function of the detection signal, the combining means being bufferless.

2. Device according to claim 1, characterized in that the switch-over means comprise a further output for coupling through, as a function of the detection signal, and at the same time, one of said inputs to said output and the other of said inputs to said further output.

3. Device according to claim 2, characterised in that the device is provided with a combination circuit for combining the detection signal and a ready signal, the memory means being adapted for generating the ready signal if they have been loaded with a new transmission block.

4. Device according to claim 3, characterised in that the device is provided with processor means, which are coupled to the detection means, for generating the modification to be applied and for feeding it to the memory means.

5. Device according to claim 4, characterised in that the memory means are provided with a first memory for generating a modification of a first type to be applied, a second memory for generating a modification of a second type to be applied, and through-coupling means for coupling through, as a function of a control signal, one of the memories to an output of the memory means, the processor means being adapted for generating the control signal in response to the detection signal.

* * * * *